Figure 1:
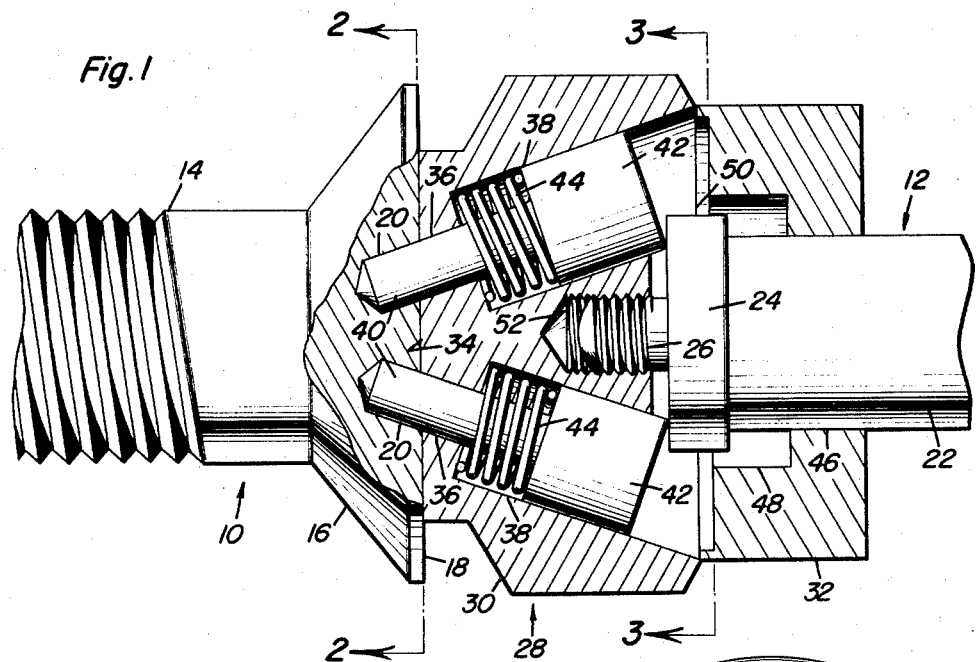

Nov. 18, 1958    R. H. KAUFFMAN    2,860,675
SCREWDRIVER HAVING SCREW RETAINING MEANS
Filed July 26, 1955

Richmond H. Kauffman
INVENTOR.

BY *[signatures]*
Attorneys

United States Patent Office 2,860,675
Patented Nov. 18, 1958

2,860,675

SCREWDRIVER HAVING SCREW RETAINING MEANS

Richmond H. Kauffman, Van Nuys, Calif., assignor of one-third to Anthony R. Cagliano and one-third to Leon J. Huberland, both of Los Angeles, Calif.

Application July 26, 1955, Serial No. 524,421

2 Claims. (Cl. 145—50)

This invention relates in general to new and useful improvements in fastening means, and more specifically to an improved screw and a driver therefor.

In order that a proper amount of torque may be placed on a screw in the driving thereof, it is necessary that there be provided a suitable connection between the head of a screw and the driver. Certain of the existing screw recesses are capable of high torque driving provided that a heavy end load is applied to the driver during driving. Without this applied end load, the driver tends to back out, destroying the recess and making removal of the screw an extremely difficult and costly operation.

There is one type of recess in existence that requires very little end load except at extreme torques. However, at these extremes, which are found particularly in aircraft applications, even this recess will strip without the necessary applied end load. This recess is not only expensive to manufacture, but requires carefully made special drivers which are relatively easily damaged and when damaged, must be completely replaced.

Inasmuch as heavy applied end loads present a difficult problem in assembly where the operator of the driver must work overhead or in other positions where he cannot lean against the work, it is the primary object of this invention to provide an improved screw and driver combination wherein the connection between the screw and the driver is capable of high torque and requires a minimum, if any, end load.

Another object of this invention is to provide an improved screw recess construction adaptable to receive a complementary driver in such a manner such that high torque is permissible without applied end load, the recess in the screw being of such a nature whereby it may be economically manufactured.

Still another object of this invention is to provide an improved driver for use in combination with screws of the type having tool receiving holes in the heads thereof which are disposed in angular relation to the axis of the screw, the driver including pins receivable in the hole and actuated by the driver in such a manner so that accidental retraction of the pins from the holes is prevented.

A further object of this invention is to provide an improved driver for special screws, the driver being of a relatively simple construction and including driving pins which, if broken, may be easily and economically replaced.

Figure 3:
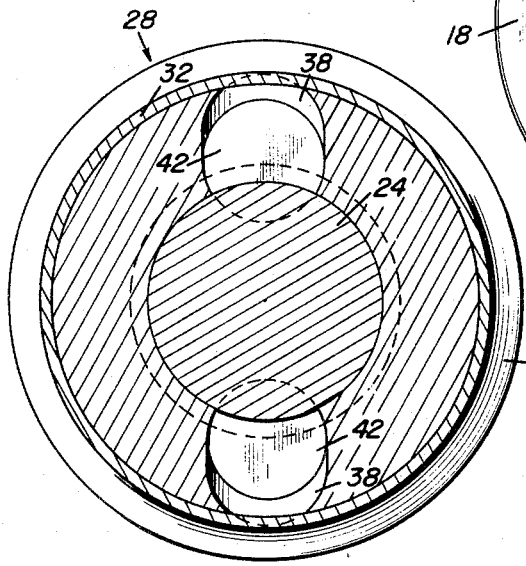
Figure 2:
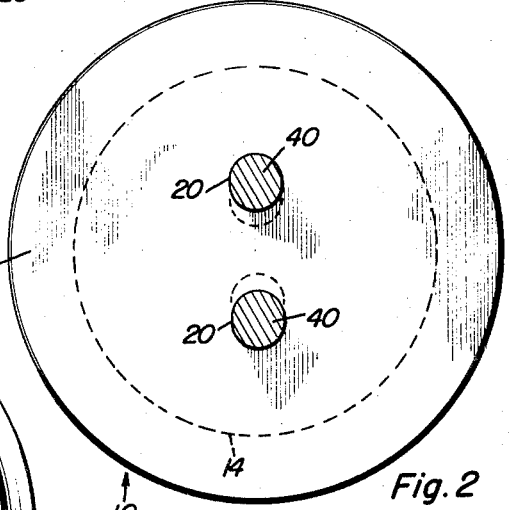

These together with other objects and advantages which will become subsequently apparent reside in the details of constructure and operation as more fully hereinafter described and claimed, reference being had to the accompanying drawings forming a part hereof, wherein like numerals refer to like parts throughout, and in which:

Figure 1 is a fragmentary elevational view showing the connection between a special screw, which is the subject of this invention, and the driver therefor, a major portion of the driver and a part of the screw being broken away and shown in section in order to clearly illustrate the details thereof;

Figure 2 is a fragmentary vertical sectional view taken substantially upon the plane indicated by the section line 2—2 of Figure 1 and shows the arrangement of the holes in the head of the screw and the relative positions of the driving pins disposed therein; and Figure 3 is a transverse vertical sectional view taken substantially upon the plane indicated by the section line 3—3 of Figure 1 and shows the details of the driving head of the driver.

Referring now to the drawings in detail, it will be seen that there is illustrated in Figure 1 a special screw, which is the subject of this invention, the screw being referred to in general by the reference numeral 10. Engaged in the screw 10 for the purpose of driving the same is a special driver, which is also the subject of this invention, which is referred to in general by the reference numeral 12.

The screw 10 includes an elongated threaded shank 14 which terminates at one end in an enlarged head 16. The head 16 includes an exposed face 18. The head 16 is provided with a pair of tool receiving holes 20 which, for purposes of illustration, are circular in cross-section and concentric with respect to the axis of the screw 10. The holes 20 are also illustrated as converging toward the shank 14. However, in order to function properly, it is only necessary that there be provided a plurality of the holes 20 and that the holes 20 be disposed in angular relation with respect to the axis of the screw 10.

The driver 12 includes an elongated shank 22 which may be provided at the end thereof not shown with a suitable driving head. The end of the shank 22 illustrated includes an annular collar 24 which is disposed substantially at the end of the shank 22. Projecting axially from the collar 24 is a threaded extension 26 of reduced cross-section.

Mounted on the driving end of the shank 22 is a driving head, which is referred to in general by the reference numeral 28. The driving head 28 includes a body portion 30 having a cap 32. The cap 32 may be secured to the body portion in any desired manner in order to facilitate the assembly of the parts carried within the body portion 30.

The body portion 30 includes a screw engaging face 34 which is disposed remote from the shank 22. Opening through the face 34 are bores 36 which are extensions of the holes 20. The bores 36 are provided at their inner ends with enlarged extensions 38. The enlarged extensions 38 of the bores 36 open through the opposite face of the body portion 30 and are closed by the cap 32.

Disposed within the bores 36 for reciprocal movement are pins 40. The pins 40 are provided at their opposite ends with enlarged portions 42 guidingly received within the extensions 38. Disposed between the bottoms of the extensions 38 and the enlarged heads 42 are coil springs 44. The coil springs 44 surround the pins 40 and urge the pins 40 to retracted positions.

The cap 32 is provided with a central bore 46 through which the shank 22 passes. The underside of the cap 32 is undercut, as at 48, to form a suitable recess for receiving the collar 24. The end of the body portion 30 remote from the face 34 is also provided with a recess 50 for receiving the collar 24. Further, the body portion 30 is provided with an axially disposed internally threaded bore 52 receiving the threaded extension 26.

It is to be noted that the collar 24 engages the heads 42 of the pins 40 to urge them through the bores 36 into projecting positions against the urging of the springs 44 to retracted positions. In the normal operation of the driver 12, the shaft 22 is retracted and the collar 24 seats within the recess formed in the cap 32. At this time, the pins 40 are fully retracted within the body portion 30. However, if desired, a small amount of the pins 40 may project out through the body portion 30 in order that they may be aligned with the holes 20. The pins 40 are then placed into alignment with the holes 20 and while the driving head 28 is held against rotation, the shank 22 is rotated slightly. As the shank 22 rotates, the collar 24 engages the heads 42 and urges the pins 40 down into the holes 20. After the pins 40 seat, the shank 22 and the driving head 28 lock up and further rotation of the shank 22 results in the driving of the screw 10.

Inasmuch as the holes 20 are disposed in angular relationship with respect to the axis of the screw 10 and since the holes are not parallel, it will be readily apparent that withdrawal of the driving head 28 from the screw 10 will be prevented unless the pins 40 are first retracted into the body portion 30. Thus, the desired amount of torque required to properly seat the screw 10 may be easily applied through the driver 12. After the screw 10 has been driven home, the rotation of the shaft 22 may be reversed, at which time the collar 24 will move away from the heads 42. The springs 44 will then effect the retraction of the pins 40 and the driver 12 will be released from the screw 10.

From the foregoing description of the driver 12, it will be readily apparent that if any part thereof should be subject to breakage, it will be the pins 40. These pins may be easily replaced by merely removing the cap 32 and inserting a new pin in the former pin's position. The pins will be relatively inexpensive and the replacement likewise.

After the driver 12 has been locked with a screw 10, the screw 10 may be driven either by continued rotation of the shank 22 or by directly rotating the driving head 28. A screw may be removed by merely reversing the direction of rotation of the driving head 28.

It is to be understood that the driver 12 is not limited in use to the driving of screws, but will apply equally as well to all threaded connectors. Accordingly, wherever reference has been made to the screw 10, fasteners such as bolts, turn-buckles, nuts, etc., may have been mentioned. Also, it will be readily apparent that the number of pins 40 will correspond to the number of the holes 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A screwdriver for use in combination with a screw having tool receiving holes, said screwdriver comprising a shank having a driving end, a driving head mounted on said driving end for axial movement relative to said shaft, said driving head having a screw engaging face remote from said shank, a plurality of bores in said driving head opening through said screw engaging face, screw driving pins receivable in tool receiving holes of a screw, said pins being slidably mounted in said bores and retractible within said driving head, said pins being engaged with said shank and being extendable by movement of said shank into said driving head, means on said shank and said driving head for effecting relative axial movement, said pins and said bores having axes disposed in angular relation to the axis of said shank, whereby withdrawal of said pins from complementary holes in a screw when said pins are extended is prevented.

2. A screwdriver for use in combination with a screw having inwardly converging tool receiving holes, said screwdriver comprising a shank having a driving end, a driving head mounted on said driving end for axial movement relative to said shank, said driving head having a screw engaging face remote from said shank, a plurality of outwardly converging bores in said driving head opening through said screw engaging face, screw driving pins receivable in the tool receiving holes of a screw, said pins being individually slidably mounted in said bores and retractable entirely within said driving head, springs carried by said means urging said pins to retracted positions, said pins being engaged by said shank and being extendable by movement of said shank into said driving head, said shank having a threaded connection with said driving head whereby when said shank is rotated in said driving head it is held against rotation, said shank moves relative to said driving head to position said pins.

References Cited in the file of this patent

UNITED STATES PATENTS

| | | |
|---|---|---|
| 66,585 | Harvey | July 9, 1867 |
| 610,423 | Van Ommeren | Sept. 6, 1898 |
| 847,774 | Hoffman | Mar. 19, 1907 |
| 954,073 | Bender | Apr. 5, 1910 |
| 1,069,312 | Zuiebel | Aug. 5, 1913 |
| 1,473,033 | Gerzen | Nov. 6, 1923 |
| 1,930,859 | Munro | Oct. 17, 1933 |
| 2,329,398 | Duffy | Sept. 14, 1943 |
| 2,442,920 | De Vries | June 8, 1948 |
| 2,448,805 | Ingram | Sept. 7, 1948 |
| 2,525,222 | Holt | Oct. 10, 1950 |